United States Patent [19]
Bernet

[11] Patent Number: 5,949,672
[45] Date of Patent: Sep. 7, 1999

[54] THREE-PHASE MATRIX CONVERTER AND METHOD FOR OPERATION THEREOF

[75] Inventor: Steffen Bernet, Bammental, Germany

[73] Assignee: ABB Patent GmbH, Mannheim, Germany

[21] Appl. No.: 08/940,147

[22] Filed: Sep. 29, 1997

[30] Foreign Application Priority Data

Sep. 27, 1996 [DE] Germany .................. 196 39 773

[51] Int. Cl.[6] .................. H02M 5/20; H02M 2/257; H02H 7/122
[52] U.S. Cl. .................. 363/159; 363/56; 363/160
[58] Field of Search .................. 363/159, 160, 363/163, 164, 165, 8

[56] References Cited

U.S. PATENT DOCUMENTS

| | | | |
|---|---|---|---|
| 4,760,321 | 7/1988 | Tanaka et al. | 360/160 |
| 4,833,588 | 5/1989 | Schauder | 363/159 |
| 5,594,636 | 1/1997 | Schauder | 363/160 |
| 5,642,273 | 6/1997 | Lai et al. | 363/56 |
| 5,710,698 | 1/1998 | Lia et al. | 363/56 |

*Primary Examiner*—Peter S. Wong
*Assistant Examiner*—Rajnikant B. Patel
*Attorney, Agent, or Firm*—Herbert L. Lerner; Laurence A. Greenberg

[57] ABSTRACT

A three-phase matrix converter for converting AC voltages of predetermined amplitude and frequency into AC voltages of any amplitude and frequency and a method for operating the same, include four-segment switches as main switches which are combined into three switch groups. A resonance capacitance is connected in parallel with each main switch, or an output capacitance of power semiconductors of the main switches acts as a resonance capacitance. An auxiliary commutation device which is provided between three-phase output connections of each switch group has an auxiliary switch constructed as a four-segment switch and a resonance inductance connected in series therewith.

28 Claims, 5 Drawing Sheets

5,949,672

THREE-PHASE MATRIX CONVERTER AND METHOD FOR OPERATION THEREOF

BACKGROUND OF THE INVENTION

FIELD OF THE INVENTION

The invention relates to a three-phase matrix converter for single-stage conversion of AC voltages of predetermined amplitude and frequency into AC voltages of any amplitude and frequency, having four-segment switches as main switches which are combined into three switch groups. The invention also relates to a method for operating the three-phase matrix converter.

The invention can be used, for example, for controlled-speed industrial drives using asynchronous or synchronous motors.

A three-phase matrix converter for single-stage power conversion of a three-phase AC voltage of specific predetermined amplitude and predetermined frequency into a three-phase AC voltage of variable amplitude and variable frequency is an alternative to hard and soft switching converters with a DC intermediate circuit (see, for example, a paper by M. G .B. Venturini and A. Alesina, entitled "Intrinsic Amplitude Limits and Optimum Design of 9-Switches Direct PWM-AC-AC Converters", in Conf. Rec. IEEE-PESC, 1988, pp. 1284–1291). The terms hard and soft switching converters in such a context relate to converters having switching processes (commutation processes) during which a respective relatively large or small amount of power loss is produced. The further development of the matrix converter is characterized by the implementation of space vector modulation, the use of the matrix converter in drives with field orientation and the use of backward turn-off IGBTs in the necessary four-quadrant switches.

The matrix converter has various advantages over conventional, hard switching PWM rectifier/DC intermediate circuit/invertor structures, for example the fact that the matrix converter does not require any capacitance in the intermediate circuit because of its single-stage power conversion. In addition, it produces lower losses than the comparable structure with a DC intermediate circuit since the commutation voltage of the matrix converter is considerably lower than that of the conventional converter with a DC intermediate circuit. Although the converter with a DC intermediate circuit requires only 24 power semiconductors (for example 12 IGBTs and 12 diodes) and the matrix converter requires 36 semiconductors (for example 18 IGBTs and 18 diodes), the installed total switch capacity for both converters generally the same because it is possible to reduce the rated currents of the switches in the matrix converter by a third.

However, the substantial switching losses limit the maximum switching frequency of hard switching converters in general to about 10 to 25 kHz in the medium power range if, for example, IGBTs are used. Increased fall and tail times with high-voltage power semiconductor components, such as GTOs, IGBTs and MCTs, exacerbate that effect even further in high-power applications, which leads either to highly voluminous and very expensive filter components or to higher motor losses in a drive used as a load.

SUMMARY OF THE INVENTION

It is accordingly an object of the invention to provide a three-phase matrix converter and a method for operation thereof, which overcome the hereinafore-mentioned disadvantages of the heretofore-known devices and methods of this general type and in which the three-phase matrix converter has a higher power density, a greater efficiency and allows higher switching frequencies.

With the foregoing and other objects in view there is provided, in accordance with the invention, a three-phase matrix converter for single-stage conversion of AC voltages of predetermined amplitude and frequency into AC voltages of any amplitude and frequency, comprising four-segment switches acting as main switches and combined into three switch groups with three-phase output connections; resonance capacitances each connected in parallel with a respective one of the main switches, or alternatively the main switches having power semiconductors with output capacitances acting as resonance capacitances; and auxiliary commutation devices each connected between the three-phase output connections of a respective two of the switch groups, the auxiliary commutation devices each having an auxiliary switch constructed as a four-segment switch and a resonance inductance connected in series with the auxiliary switch.

In accordance with another feature of the invention, the main switches and/or the auxiliary switches each include two series-connected parallel circuits each having an IGBT semiconductor and a reverse diode.

In accordance with a further feature of the invention, each of the main switches includes two parallel-connected GTO thyristors which can be turned off, and the auxiliary switches each include two parallel GTO thyristors which can be turned off or fast thyristors.

In accordance with an added feature of the invention, the main switches and/or the auxiliary switches each include two series-connected parallel circuits of an asymmetric GTO with a reverse diode.

With the objects of the invention in view, there is also provided a method for operating the three-phase matrix converter, which comprises selecting a switching sequence of a switch group as a function of input voltage intervals and a polarity of an output current, causing two capacitive commutation operations and one inductive commutation operation to take place; selecting pulse patterns causing the inductive commutation operations per period duration of a switching frequency to take place at the same time; and transforming natural inductive commutation operations into capacitive commutation operations with the auxiliary commutation devices by changing the polarity of the currents with the main switches before active switching processes of the main switches.

In accordance with another mode of the invention, there is provided a method which comprises always using a concatenated input voltage having the greatest magnitude as the commutation voltage for the transformed inductive commutation operation.

In accordance with a further mode of the invention, there is provided a method which comprises initiating the commutation operation in all three switch groups with the switch group having the shortest duty ratio of the three main switches which are initially on.

In accordance with an added mode of the invention, there is provided a method which comprises selecting the switching sequence to cause the two capacitive non-transformed commutation operations to take place first, and the transformed commutation operation to takes place at the end of the period duration of the switching frequency.

In accordance with a concomitant mode of the invention, there is provided a method which comprises always carrying out the transformation of the commutation operation using two auxiliary switches of the auxiliary commutation devices connected between the three-phase output phases of the switch groups having output currents of opposite polarity.

The advantages which can be achieved by the invention are, in particular, that the three-phase quasi-resonant matrix converter according to the invention achieves considerably lower switching and total losses than the hard switching matrix converter at medium and high switching frequencies. Special pulse patterns and additional auxiliary commutation devices are used. The additional auxiliary commutation devices include three four-quadrant switches and three resonance inductances, which allow soft switching of the overall converter and PWM control. In consequence, the main switches of the matrix converter can advantageously be operated as zero voltage switches (ZVS), and the auxiliary switches of the auxiliary commutation devices can be operated as zero current switches (ZCS).

Since the auxiliary switches carry only very short current pulses, the rated currents of these switches can be reduced in comparison with the rated currents of the main switches. The quasi-resonant matrix converter according to the invention is an advantageous alternative to hard and soft switching PWM rectifier/DC intermediate circuit/invertor structures for high-power applications.

Other features which are considered as characteristic for the invention are set forth in the appended claims.

Although the invention is illustrated and described herein as embodied in a three-phase matrix converter and a method for operation thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
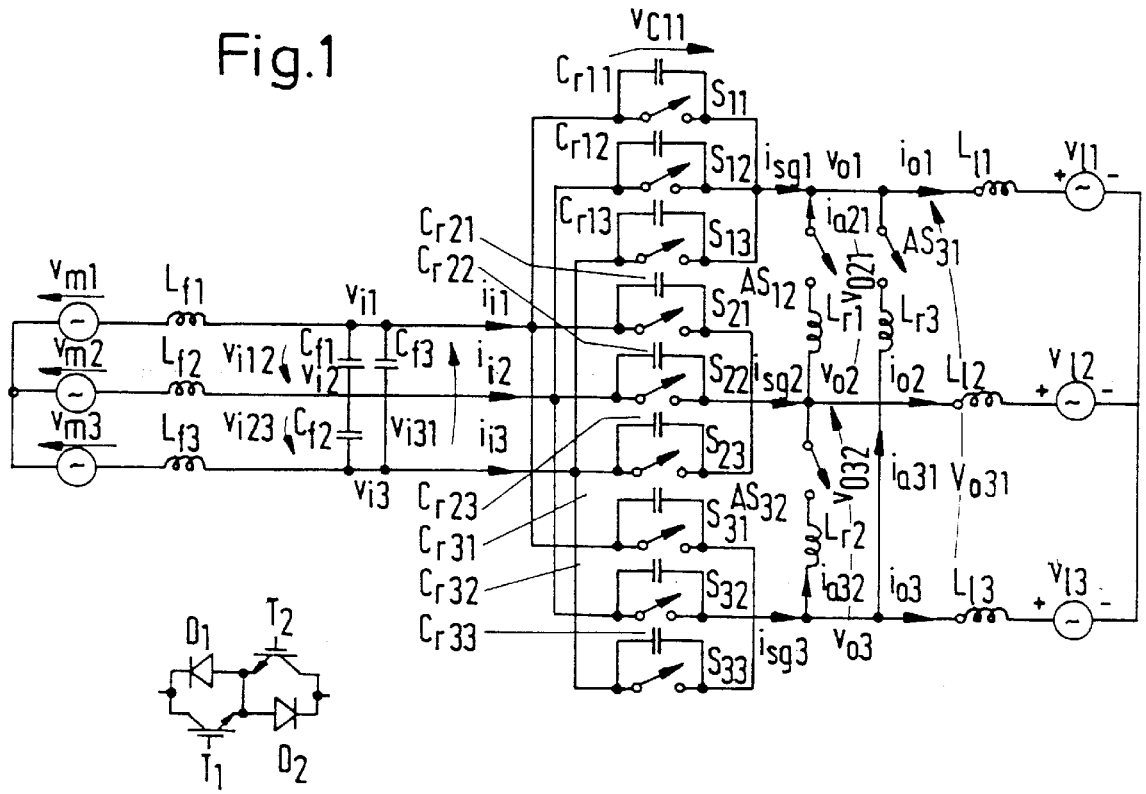
FIG. 1 is a schematic circuit diagram of a quasi-resonant three-phase matrix converter.

Referring now to the figures of the drawings in detail and first, particularly, to FIG. 1 thereof, there is seen a circuit configuration of a three-phase quasi-resonant matrix converter. A three-phase filter with respective filter inductances $L_{f1}$ and $L_{f2}$ and $L_{f3}$ in mains phases and respective filter capacitances $C_{f1}$ and $C_{f2}$ and $C_{f3}$ between the phases, is connected on one side to three-phase mains having mains voltages $v_{m1}$, $v_{m2}$, $v_{m3}$ and on the other side to three respective three-phase switch groups of the matrix converter. With respect to a mains star point, input voltages of the three switch groups are designated by reference symbols $v_{i1}$, $v_{i2}$, $v_{i3}$ (in general designated by reference symbol $v_i$), and concatenated input voltages are designated by reference symbols $vi_{12}$, $vi_{23}$, $vi_{31}$. Input currents of the switch groups are designated by reference symbols $i_{i1}$, $i_{i2}$, $i_{i3}$.

A first switch group has three main switches ($S_{11}$, $S_{12}$, $S_{13}$) which are each connected to a mains phase on the input side. Resonance capacitors $C_{r11}$, $C_{r12}$, $C_{r13}$ are connected in parallel with the main switches. Switch voltages (which are equal to voltages across the resonance capacitances) are designated by reference symbols $v_{c11}$, $V_{c12}$, $V_{c13}$ (some of which not illustrated) Outputs of the main switches $S_{11}$, $S_{12}$, $S_{13}$ are connected to one another. A switch group current flowing through the common output is designated by reference symbol $i_{sg1}$, and an output voltage of this first switch group is designated by reference symbol $v_{o1}$.

A second switch group likewise has three main switches $S_{21}$, $S_{22}$, $S_{23}$ which are each connected to a mains phase on the input side. Resonance capacitances $C_{r21}$, $C_{r22}$, $C_{r23}$ are connected in parallel with the main switches. Outputs of the main switches $S_{21}$, $S_{22}$, $S_{23}$ are connected to one another. A switch group current flowing through the common output is designated by reference symbol $i_{sg2}$, and an output voltage of this second switch group is designated by reference symbol $V_{o2}$. Switch voltages $v_{c21}$, $V_{c22}$, $V_{c23}$ are not illustrated.

A third switch group likewise has three main switches $S_{31}$, $S_{32}$, $s_{33}$ which are each connected to a mains phase. Resonance capacitances $C_{r31}$, $C_{r32}$, $C_{r33}$ are connected in parallel with the main switches. Outputs of the main switches $S_{31}$, $S_{32}$, $S_{33}$ are connected to one another. A switch group current flowing through the common output is designated by reference symbol $i_{sg3}$, and an output voltage of this second switch group is designated by reference symbol $v_{o3}$. Switch voltages $v_{c31}$, $v_{c32}$, $v_{c33}$ are not illustrated.

The outputs of the first and third switch groups can be connected to one another through an auxiliary switch $AS_{31}$ of an auxiliary commutation device with a series-connected resonance inductance $L_{r3}$. A current through this auxiliary commutation device is designated by reference symbol $i_{a31}$.

The outputs of the first and second switch groups can be connected to one another through an auxiliary switch $AS_{12}$ of an auxiliary commutation device with a series-connected resonance inductance $L_{r1}$. A current through this auxiliary commutation device is designated by reference symbol $i_{a21}$.

The outputs of the second and third switch groups can be connected to one another through an auxiliary switch $AS_{32}$ of an auxiliary commutation device with a series-connected resonance inductance $L_{r2}$. A current through this auxiliary commutation device is designated by reference symbol $i_{a32}$.

Voltages across the auxiliary commutation devices are designated by reference symbols $v_{o21}$, $v_{o32}$, $v_{o31}$.

Connection points of the auxiliary commutation devices to the outputs of the three switch groups form load connections of the three-phase matrix converter, through which respective output currents $i_{o1}$ and $i_{o2}$ and $i_{o3}$ flow (output parameters are generally designated by reference symbol o). Respective load inductances are designated by reference symbols $L_{l1}$, and $L_{l2}$ and $L_{l3}$ and respective load voltages are designated by reference symbols $v_{l1}$ and $v_{l2}$ and $v_{l3}$.

Both the resonance capacitances $C_{r11}$ to $C_{r33}$ and the resonance inductances $L_{r1}$ to $L_{r3}$ preferably have the same values.

If the output capacitance of the power semiconductors of the main switches is sufficiently large, it is possible to dispense with the resonance capacitances.

The left-hand section of FIG. 1 illustrates, by way of example, the structure of a main switch (four-segment switch) $S_{11}$, $S_{12}$, $S_{13}$, $S_{21}$, $S_{22}$, $S_{23}$, $S_{31}$, $S_{32}$, $S_{33}$ (in general S) and of an auxiliary switch (four-segment switch) $AS_{31}$, $AS_{12}$, $AS_{32}$ (in general AS). As can be seen, the four-segment switch includes two IGBT semiconductors $T_1$, $T_2$ and two reverse diodes $D_1$, $D_2$. Elements $D_1$ and $T_1$ as well as $D_2$ and $T_2$ are respectively connected in parallel, and the two parallel circuits are connected in series. The two IGBT semiconductors and reverse diodes for forming the auxiliary switch AS can be constructed for considerably lower rated currents than the components used for the main switches.

Alternatively, the four-segment main switches S can also be based on other power semiconductor components which can be switched off actively (such as GTOs, MOSFETs, bipolar transistors or MCTs), as well as the diodes which may be required. In contrast to this, the auxiliary switch AS can alternatively be implemented by using power semiconductor components which can be switched on actively (such as thyristors, GTOs, MCTs, MOSFETs or bipolar transistors), as well as the diodes which may be required. In the upper power range in particular, it is possible to use twelve GTOs which can be turned off in the main switches as well as two GTOs which can be turned off or two fast thyristors which can be turned off and have reduced rated currents in the main switch, with two GTO thyristors and two fast thyristors in each case being connected in parallel.

Figure 2:
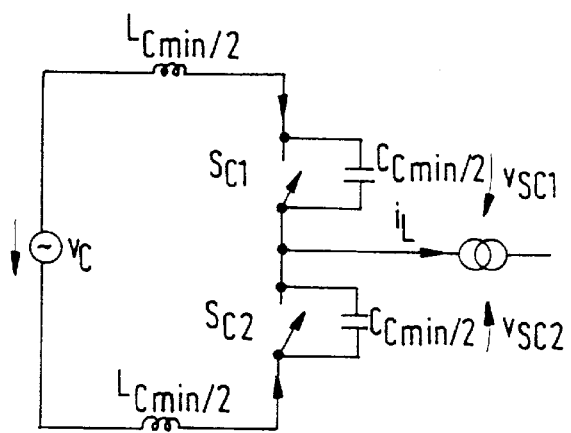
FIG. 2 is a schematic diagram of an equivalent circuit.

The commutation of the current in an output phase of a hard switching converter from one switch to another within a switch group can easily be described using the equivalent circuit in FIG. 2. The equivalent circuit shows a series circuit of an inductance $L_{Cmin/2}$, a switch SC1, a switch SC2 and an inductance $L_{Cmin/2}$, to which a commutation voltage $v_c$ is applied. A respective capacitance $C_{cmin/2}$ is connected in parallel with each switch. The connection for the load is connected to connection points of the two switches. In the equivalent circuit, a load current $i_L$ represents a motor phase current, the commutation voltage $v_c$ represents an effective concatenated voltage across the input, and minimum values of the commutation inductance $L_{Cmin}$ and of the commutation capacitance $C_{cmin}$ of a hard switching matrix converter are provided by a parasitic inductance of the circuit and an output capacitance of the power semiconductors.

It is possible to distinguish between two fundamental types of commutation operation on the basis of the power consumed by the load (motor). So-called inductive commutation (natural commutation with an active switching-on process) and capacitive commutation (forced commutation with an active switching-off process). If the voltage $v_c$ and the current $i_L$ are positive and the switch SC2 is switched on, then an inductive commutation operation can be initiated only by actively switching the switch SC1 on. Since virtually the entire voltage is dropped across the switch SC1, the switching-on losses in the switch (IGBT) being switched on are substantial, and the switching process is called hard. The commutation operation is completed by switching the switch SC2 off passively during the reverse-current chopping.

When the switch SC1 is switched on and both the commutation voltage $v_c$ and the load current $i_L$ are positive, a capacitive commutation operation can be achieved only by switching the switch SC1 off actively. Since the commutation inductance $L_c$ and the commutation capacitance $C_c$ are each at their minimum values $L_{Cmin}$ and $C_{Cmin}$, a voltage $v_{SC1}$ across the switch SC1 in consequence rises, while a voltage $v_{SC2}$ across the switch SC2 falls, until the switch SC2 switches on passively at zero voltage. Current commutation cannot start until after this time, and this process causes switching-off losses in the switch (IGBT) which is switching off. The active switching-off process of such a capacitive commutation operation is therefore also a hard switching process.

Since both the commutation voltage (the concatenated input voltage) and the load current (motor current in one phase) change polarity during operation of the matrix converter, all of the main switches must be switches which can turn off backwards and forwards and can conduct in both directions (four-quadrant switches).

A reduction in the high switching losses is achieved if the quasi-resonant matrix converter according to the invention is used instead of the hard switching matrix converter. In the matrix converter according to the invention, it is advantageous that the only commutation operations between main switches in the matrix converter are capacitive. In consequence, these switches can advantageously be operated as zero voltage switches, and the switching-off process can be relieved of load by increasing the commutation capacitance (commutation capacitance $C_c > C_{Cmin}$, commutation inductance $L_c = L_{Cmin}$). In contrast to this, the auxiliary switches carry out only inductive switching processes, which are relieved of load by increasing the commutation inductance (commutation inductance $L_c > L_{Cmin}$, commutation capacitance $C_c = C_{cmin}$).

These switches therefore advantageously operate as zero-current switches.

In a paper by M. G. B. Venturini and A. Alesina, entitled "Intrinsic Amplitude Limits and Optimum Design of 9-Switches Direct PWM-AC-AC Converters", in Conf. Rec. IEEE-PESC, 1988, pp. 1284–1291, a control principle for a matrix converter is derived, which guarantees sinusoidal input currents with an adjustable power factor, and in which the maximum possible voltage transformation ratio is 0.866. Since this fundamental algorithm governs only the duty ratios of the four-quadrant switches, it is always still possible to select optimum pulse patterns (switching sequence of the active devices) in a hard switching matrix converter. In the case of the quasi-resonant matrix converter according to the invention, the switching sequence is governed by the operation of the auxiliary commutation devices. If one assumes symmetrical input voltages $$v_{i1} = V_i \cos(\omega_i t + \theta_i)$$
$$v_{i2} = V_i \cos(\omega_i t + \theta_i - 120°) \quad (1)$$
$$V_{i3} = V_i \cos(\omega_i t + \theta_i + 120°)$$

where the mains angular frequency is $$\omega_i = 2 \cdot \pi \cdot f_i = \frac{2 \cdot \pi}{T_i},$$

Figures 3, 4:
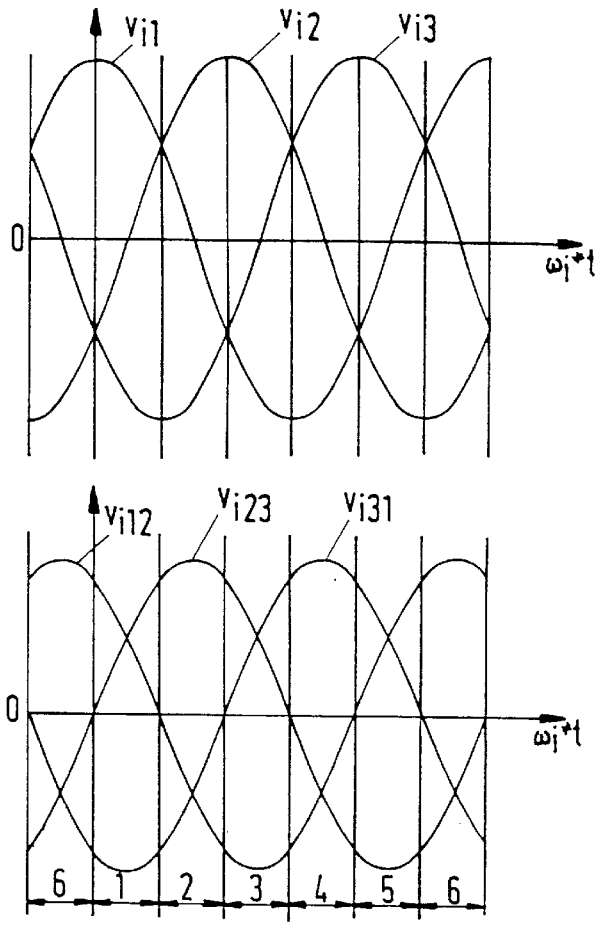
FIG. 3 is a graph showing a definition of 60° voltage intervals for the input voltages.
FIG. 4 is a table of pulse patterns and switching sequences of the quasi-resonant matrix converter.

$V_i$=amplitude, $\theta_i$=shift angle, $f_i$=mains frequency, $T_i$=mains period duration (the input parameters are in general designated by reference symbol i), then the three-phase voltage system allows six 60° voltage intervals 1, 2, 3, 4, 5, 6 to be defined, in which none of the three concatenated input voltages $v_{i12}$, $v_{i23}$ and $v_{i31}$ change polarity. These six voltage intervals are shown in FIG. 3 using waveforms of $v_{i1}$, $v_{i2}$, $v_{i3}$ and $v_{i12}$, $v_{i23}$, $v_{i31}$. In the case of $\theta_i=0°$, the voltage intervals are given by:

Voltage interval 1: $0° \leq \omega_i t \leq 60°$

Voltage interval 2: $60° \leq \omega_i t \leq 120°$

Voltage interval 3: $120° \leq \omega_i t \leq 180°$ (2)

Voltage interval 4: $180° \leq \omega_i t \leq 240°$

Voltage interval 5: $240° \leq \omega_i t \leq 300°$

Voltage interval 6: $300° \leq \omega_i t \leq 360°$

In the table in FIG. 4, the switching sequence is designated "forwards" by reference symbol F (commutation from $S_{11}$ to $S_{12}$ to $S_{13}$ to $S_{11}$ and from $S_{31}$ to $S_{32}$ to $S_{33}$ to $S_{31}$ etc.), and the switching sequence is designated "backwards" by reference symbol B (commutation from $S_{11}$ to $S_{13}$ to $S_{12}$ to $S_{11}$ etc. and from $S_{31}$ to $S_{33}$ to $S_{32}$ to $S_{31}$ etc.). An ARCP commutation operation is designated by reference symbol a and a natural capacitive commutation operation (ZVS) is designated by reference symbol c. Variables x which are used for the output currents $i_{ox}$ and the mains switches $S_{x1}$, $S_{x2}$, $S_{x3}$ can assume the values 1, 2, 3.

The pulse pattern table illustrated in FIG. 4 shows that there is always a switching sequence which allows two capacitive commutation operations and one ARCP commutation operation (ARCP=Auxiliary Resonant Commutated Pole commutation operation) in each period duration $T_s$ of the switching frequency $f_s$. An ARCP commutation operation is an inductive commutation operation which has been transformed into a capacitive commutation operation by using one or two auxiliary commutation devices. The transformation is achieved by the auxiliary commutation devices, which change the polarity of the switch currents before the active switching processes in the main switches. If the output current does not change its polarity, the switching sequence is reversed in each 60° voltage interval. If one assumes symmetrical output currents $$i_{o1}=i_o \cdot \cos(\omega_o t + \theta_o),$$

$$i_{o2}=i_o \cdot \cos(\omega_o t + \theta_o - 120°), \quad (3)$$

$$i_{o3}=i_o \cdot \cos(\omega_o t + \theta_o + 120°),$$

where $i_o$=amplitude, $\omega_o$=output angular frequency, and $\theta_o$=output shift angle, then the switch groups having an output current $i_{ox}$ (x=1, 2, 3) with the same polarity always have the opposite switching sequence to that of the further switch group. In addition, the commutation voltage of the ARCP commutation operation is always the concatenated input voltage having the greatest magnitude.

It will be shown in the following text that this is a highly advantageous characteristic, which considerably simplifies the construction and method of operation of the quasi-resonant matrix converter according to the invention. However, the use of ARCP commutation in all three switch groups not only requires the use of the switching sequences listed in the table in FIG. 4, but also synchronization of the three ARCP commutation operations in the three switch groups during each period duration $T_s$ of the switching frequency. If the pulse patterns (switching sequences) quoted in the table are used, then, for example, the switch group having the shortest duty ratio of the three switches which are initially on (one switch in each group) initiates the ARCP commutation operation in all three switch groups. The remaining duty ratio elements of the switch groups having the longer duty ratios are then implemented at the end of the period duration $T_s$ of the switching frequency.

However, if the original state of the switching sequence shown in the table in FIG. 4 is changed in such a way that the two capacitive commutation operations are carried out first, then it is possible to synchronize the ARCP commutation operations of the three switch groups at the end of the period duration $T_s$ as well. Since both of the proposed pulse patterns carry out two thirds of the commutation operations capacitively and only one third as ARCP commutation operations, they differ substantially from conventional switch patterns for hard switching matrix converters which, as a rule, carry out 50% of the commutation operations inductively, and 50% capacitively.

If the pulse patterns described above are used in each of the six voltage intervals of the input voltage, then there are two capacitive commutation operations and one ARCP commutation operation in each switch group per period duration $T_s$ of the switching frequency. In consequence, all of the main switches $S_{11}$ to $S_{33}$ of the matrix converter switch off exclusively actively, and switch on passively at a voltage of zero (that is to say they are zero-voltage switches ZVS). In the same manner, all of the auxiliary switches $AS_{12}$, $AS_{32}$ and $AS_{31}$ switch on actively and switch off passively with the reverse-current chopping (that is to say they are zero-current switches ZCS).

The following text describes the ARCP commutation principle, which transforms natural inductive commutation into capacitive commutation by changing the polarity of the switch currents. In order to simplify the explanations, it is assumed that the concatenated input voltages $v_{i12}$, $v_{i23}$, $v_{i31}$ and the output currents $i_{o1}$, $i_{o2}$, $i_{o3}$ are constant during the commutation operation. In addition, the switches are assumed to be ideal.

Figure 5:
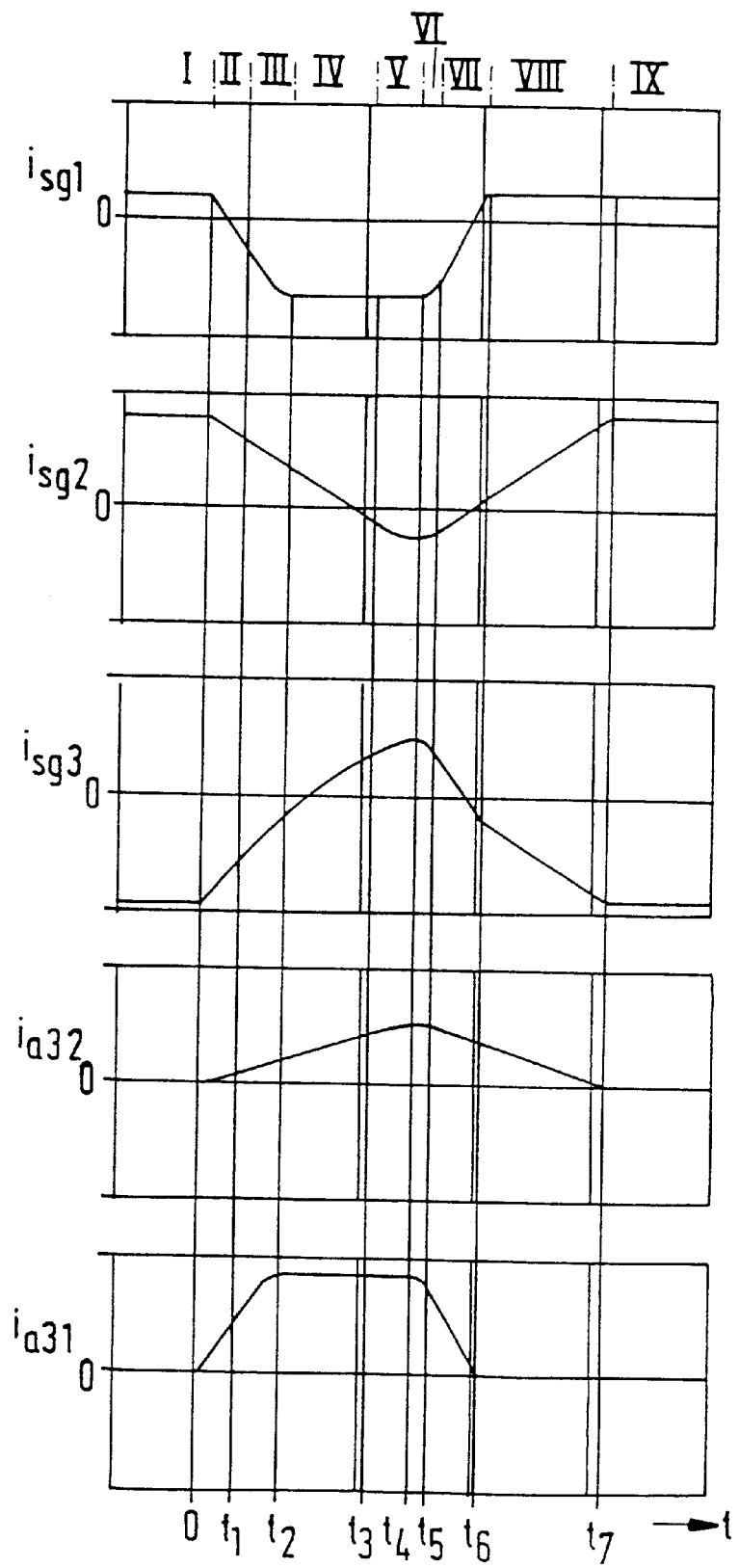
FIG. 5 is a graph showing current and voltage waveforms for an ARCP commutation operation.

The quasi-resonant matrix converter according to the invention is intended to be operated in the sixth voltage interval, and the intention is to use the pulse patterns which are illustrated in the table in FIG. 4 for the output current $i_{o1}>0$, $i_{o2}>0$ and $i_{o3}<0$. FIG. 5 shows current waveforms ($i_{sg1}$, $i_{sg2}$, $i_{sg3}$, $i_{a32}$, $i_{a31}$) of an ARCP commutation which results in individual intervals I, II, III, IV, V, VI, VII, VIII, IX:

Interval I (t<0):

In the interval I, the quasi-resonant matrix converter operates in an initial position shown in FIG. 5. The main switches $S_{12}$, $S_{22}$, and $S_{31}$ carry the output current $i_{o1}$, $i_{o2}$ and $i_{o3}$ and all of the auxiliary switches AS are open.

Interval II ($0 \leq t \leq t_1$; wherein the auxiliary switches $AS_{32}$ and $AS_{31}$ switch on at t=0, and the main switch $S_{12}$ switches off at t=$t_1$)

The interval II is initiated by the simultaneous switching-on processes of the auxiliary switches $AS_{31}$ and $AS_{32}$. The currents in the auxiliary commutation paths rise linearly in accordance with $$i_{a31} = i_{a32} = \frac{|V_{i12}| \cdot t}{L_r} \quad (4)$$

where $L_r=L_{r3}$ or $L_{r2}$.

This current rise is caused by the positive voltages $V_{o31}=V_{o32}=v_{i12}$ across the auxiliary commutation devices. The absolute values of the switch group currents $$i_{sg1}=i_{o1}-i_{a31}$$

$$i_{sg2} = i_{o2} - i_{a32} \quad (5)$$

$$i_{sg3} = i_{o3} + i_{a31} + i_{a32}$$

decrease. The current $i_{sg1}$ changes its polarity and reaches a negative boost current $-i_b$ at a time $t_1$.

Interval III ($t1 \leq t \leq t_2$; wherein the process of switching off $S_{12}$ occurs at $t_1$, and the process of switching $S_{11}$ on occurs at $t_2$)

The interval III starts at $t_1$, when the on switch $S_{12}$ is actively switched off. The current $i_{sg1}$ commutates into the three parallel capacitances of the first switch group and reverses their charge during an oscillation process with the resonance inductance $L_{r3}$. The peak currents in the first switch group and the auxiliary switch $AS_{31}$ reach $$i_{a31}(t_2) \approx i_{01} + i_b + \frac{|V_{i12}|}{\sqrt{\frac{L_r}{3 \cdot C_r}}} \quad (6)$$

$$i_{sg1}(t_2) \approx -i_b - \frac{|V_{i12}|}{\sqrt{\frac{L_r}{3 \cdot C_r}}} \quad (7)$$

where $C_r = C_{r11}$ or $C_{r12}, C_{r13}$, $L_r = L_{r3}$ provided that ib is small ($i_b \approx 0$). The main switch $S_{11}$ switches on passively at the time $t_2$, at a switch voltage of zero.

Interval IV ($t_2 \leq t \leq t_3$; wherein the process of switching $S_{11}$ on takes place at $t_2$, and the process of switching $S_{22}$ off takes place at $t_3$):

Since $S_{11}$ switches on at $t_2$ at the start of the interval IV, the voltage $v_{o31}$ across the auxiliary commutation device between the first phase and the third phase is zero. In consequence, the currents $i_{sg1}$ and $i_{a31}$ flow in a freewheeling circuit through the main switches $S_{11}$ and $S_{31}$, and remain constant. The linearly changing currents $i_{sg2}$ and $i_{sg3}$ change their polarity, and $i_{sg2}$ reaches the negative boost current $-i_b$ at $t_3$.

Interval V ($t_3 \leq t \leq t_4$; wherein the process of switching $S_{22}$ off takes place at $t_3$; and the process of switching $S_{21}$ on and switching $S_{31}$ off takes place at $t_4$):

The mode of operation in the interval V is caused by the active process of switching $S_{22}$ off at $t_3$, with the current $i_{sg2}$ commutating into the three capacitances in the second switch group and reversing their charge during an oscillation process. The currents reach $$i_{sg2}(t_4) \approx -i_b - \frac{|V_{i12}|}{\sqrt{\frac{L_r}{3 \cdot C_r}}} \quad (8)$$

where $C_r = C_{r21}$ or $C_{r22}$ or $C_{r23}$, $L_r = L_{r2}$, $$i_{sg3}(t_4) \approx 2 \cdot \left( i_b + \frac{V_{i12}}{\sqrt{\frac{L_r}{3 \cdot C_r}}} \right) \quad (9)$$

where $C_r = C_{r21}$ or $C_{r22}$ or $C_{r23}$ or $C_{r11}$ or $C_{r12}$ or $C_{r13}$, $L_r = L_{r2}$ or $L_{r3}$, when $i_b \approx 0$ and $S_{21}$ switches on passively at a switch voltage of zero.

Interval VI ($t_4 \leq t \leq t_5$: wherein the process of switching $S_{21}$ on and of switching $S_{31}$ off takes place at $t_4$; and the process of switching $S_{32}$ on takes place at $t_5$):

The interval VI is initiated by the active process of switching switch $S_{31}$ off. The current $i_{sg3}$ commutates into the three capacitances in the third switch group and reverses their charge until the switch $S_{32}$ switches on passively at a switch voltage of zero.

Interval VII ($t_5 \leq t \leq t_6$; wherein the process of switching $S_{32}$ on takes place at $t_5$, and the process of switching $AS_{31}$ off takes place at $t_6$):

The voltage $v_{o31} = v_{o32} = -v_{i12}$ across the two active auxiliary commutation devices causes a linear fall in the currents $$i_{a31} = i_{a31}(t_5) - \frac{|V_{i12}| \cdot t}{L_r}, \quad (10)$$

where $L_r = L_{r3}$, $$i_{a32} = i_{a32}(t_5) - \frac{|V_{i12}| \cdot t}{L_r}, \quad (11)$$

where $L_r = L_{r2}$.

In consequence, the currents $i_{sg1}$, $i_{sg2}$ and $i_{sg3}$ change their polarity in accordance with equations (5).

Interval VIII ($t_6 \leq t \leq t_7$; wherein the process of switching $AS_{31}$ off takes place at $t_6$, and the process of switching $AS_{32}$ off takes place at $t_7$):

At $t_6$ and $t_7$, the currents reach the value zero $$i_{a31}(t_6) = 0 \quad (12)$$

$$i_{a32}(t_7) = 0 \quad (13)$$

and the switches $AS_{31}$ and $AS_{32}$ switch off passively at a current of zero as zero-current switches.

Interval IX ($t_7 \leq t$; wherein the process of switching $AS_{32}$ off takes place at $t_7$):

The switching state for interval IX is reached when $AS_{32}$ switches off at time $t_7$. During the ARCP commutation operation, the current commutates from the switches $S_{x2}$ to the switches $S_{x1}$ (x=1,2) and from the switches $S_{x1}$ to the switches $S_{x2}$ (x=3). It is also possible for the oscillation processes described above to overlap.

Analogous commutation operations take place in each 60° voltage interval with the polarity of the output current being arbitrary, if the pulse patterns specified in FIG. 4 are used. It is essential that, during the ARCP commutation operation, those two auxiliary switches are always used which are between the output phases having output currents with opposite polarities. The voltage across the active auxiliary commutation paths during the ARCP commutation operation is always the concatenated input voltage having the greatest magnitude. In addition to the ARCP commutation operation, in each case there are two unsynchronized natural ZVS commutation operations (capacitive commutation operation) in each switch group per period duration $T_s$ of the switching frequency, which do not require auxiliary commutation devices.

An inductive commutation operation, that is to say a hard active switching-on process for a four-quadrant switch, may possibly be implemented in each switch group if the old pulse pattern in FIG. 4 is used at the end of a voltage interval and the new voltage interval starts before the end of the period duration $T_s$. It is presupposed that the pulse patterns for the new voltage interval are not used until the start of this new period duration $T_s$. However, the resultant energy lost during such a hard switching-on process for a four-quadrant switch can normally be ignored, provided the switching frequency $f_s$ is sufficiently high, since the commutation voltage of this inductive commutation operation is always the very low concatenated input voltage, which changes its polarity at the end of the voltage interval.

If the output current of a phase changes its polarity at a random point during the period duration $T_s$ and the new pulse pattern is not used until the new period duration $T_s$ of the switching frequency, then the ARCP commutation operation takes place essentially as already described. This is true even if the output current changes its polarity before or during the ARCP commutation operation.

However, in the worst case, it is also possible for two capacitive commutation operations to be transformed into two inductive commutation operations, if the switching sequence of the old pulse pattern is used after the output current has changed its polarity. In consequence, two active switching-on processes can take place, in which stored energy from the resonance capacitances in a switch group is converted into heat during the process of switching the switches on actively. Nevertheless, it is advantageous that the commutation voltage for both possible inductive commutation operations is always one of the two concatenated input voltages in a 60° voltage interval having a magnitude which is relatively small.

With the exception of inductive commutation operations which are caused by a change in the 60° voltage interval of the input voltage or by a polarity change in the output current of the converter, the switches in the quasi-resonant matrix converter according to the invention can, in principle, operate as zero-voltage switches. However, if the output current is very small before or after a zero crossing of the phase current, then the capacitive commutation operation can be ended by a hard active switching-on process before a maximum commutation duration $t_{Cmax}$ has elapsed, in order to avoid extremely long commutation operations. In consequence, an area $$\frac{t_{hard}}{T_0} = \frac{2}{\pi} \arcsin 3 \cdot \sqrt{3} \cdot C_r \cdot \frac{v_N}{\sqrt{2} \cdot t_{Cmax} \cdot i_0}, \quad (14)$$

exists where $t_{hard}$=time interval in which hard switching takes place (in which the ZVS area is left in order to avoid corrupting the current and voltage waveforms at the respective input and output of the converter)

$T_o$=period duration of the output current, $v_N$=concatenated rated input voltage, $t_{Cmax}$=maximum commutation duration of a capacitive commutation operation, $i_o$=amplitude of the output current, $C_r$=one of the resonance capacitances $C_{r11}$ to $C_{r13}$, in which the area of zero-voltage switching is left since one or two capacitive commutation operations are ended by a hard active switching-on process. In the same way as in the case of the active switching-on process described above, the resonance capacitances of the respective switch group have their charges reversed through the switch which switches on actively, resulting in losses. If the input voltage and the output current are governed by the specific application, the remaining area of zero-voltage switching $$\frac{t_{soft}}{T_0} = 1 - \frac{t_{hard}}{T_0} \quad (15)$$

where $t_{soft}$=time interval in which of the new quasi-resonant converter, which switching is carried out completely softly, is defined by the resonance capacitances and $t_{Cmax}$. It has been indicated above that the ZVS area can also be left at the boundary between two 60° voltage intervals for a maximum of one switching process per switch group.

The selection of the resonance capacitances, the resonance inductances and the choice of the boost current essentially govern the losses, the commutation times, the minimum duty ratios and the di/dt (current gradients) and du/dt (voltage gradients) which occur in the quasi-resonant matrix converter. All of the values should be chosen in such a way that, on one hand, the losses are minimal and, on the other hand, sufficiently short commutation times can be achieved. The selection of the resonance inductances is simplified by the fact that the commutation voltage of the ARCP commutation operation only varies slightly. In addition to external capacitances, the output capacitances of the power semiconductors, which are always present in any case, can also be used as resonance capacitances.

In contrast to the compromises which must be reached in the case of an ARCP converter with a DC intermediate circuit, it is also necessary when constructing the ARCP matrix converter (in particular when constructing the resonance capacitances) to leave the zero-voltage switching area. The additional energy which is introduced into the tuned circuit by the boost current should be considerably greater than the energy losses which occur during the ARCP oscillation phase. Two of the three auxiliary switches operate in the steady state at the same switching frequency as the zero-voltage switches in the quasi-resonant matrix converter. Since the auxiliary switches only carry very short current pulses, the rated currents of these switches can be very much smaller than those of the main switches. In particular, MCTs can be used for medium and high switching frequencies, or thyristors which can turn off backwards can be used for low switching frequencies and high output powers.

Figure 6:
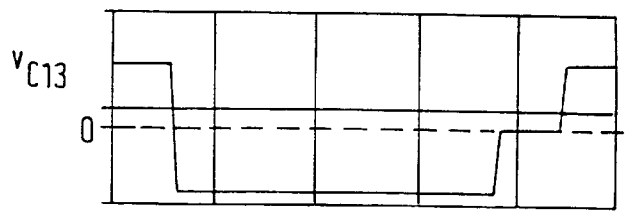
FIG. 6 is a graph showing switch voltages and a switch group current of a first switch group of the quasi-resonant matrix converter.
Figure 6:
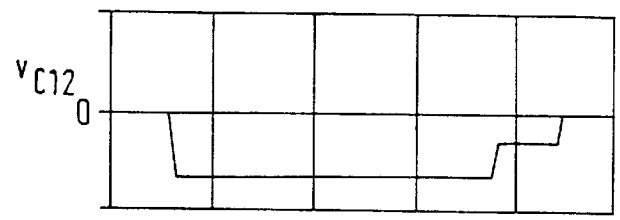
Figure 6:
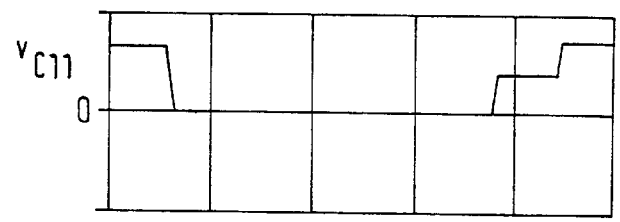
Figure 6:
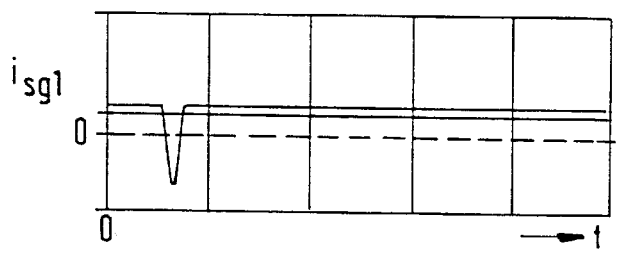

FIG. 6 shows the switch voltages $v_{C11}$, $v_{C12}$, $V_{C13}$ and the switch group current $i_{sg1}$ in the voltage interval 6. Since the output current $i_{o1}$ is positive, the pulse pattern $S_{12} \rightarrow S_{11} \rightarrow S_{13} \rightarrow S_{12}$ is implemented in the first switch group in accordance with the table in FIG. 4. The change in the polarity of $i_{sg1}$ marks the ARCP commutation operation of the output current $i_{o1}$ from $S_{12}$ to $S_{11}$. The two other commutation operations from $S_{11}$ to $S_{13}$ and from $S_{13}$ to $S_{12}$ are natural ZVS commutation operations, which do not use the auxiliary commutation device.

Figure 7:
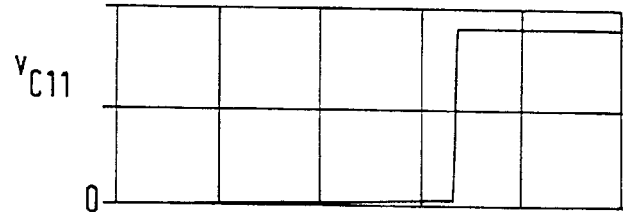
FIG. 7 is a graph showing a switch voltage and switching state variables for the state of a main switch and the output current of the quasi-resonant matrix converter.
Figure 7:
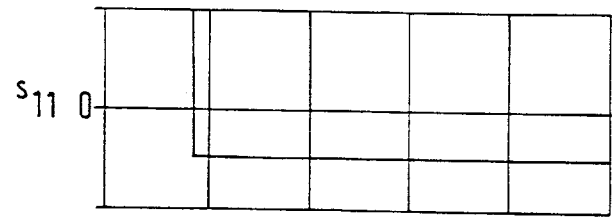
Figure 7:
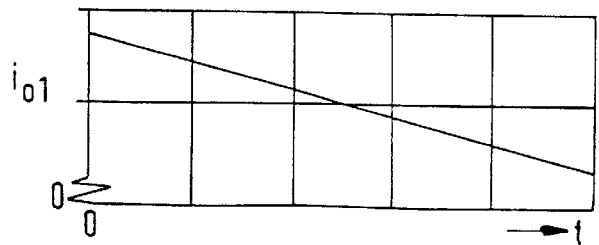

The end of a very slow capacitive commutation operation from $S_{11}$ to $S_{13}$ in the voltage interval 6, which is caused by the output current $i_{o1}$ having a very low value, can be seen in FIG. 7. First of all, the switch $S_{11}$ is switched off (see the switching state variable sll for the main switch $S_{11}$), and the voltage across $S_{11}$ rises slowly. Once the maximum commutation duration $t_{Cmax}$ has elapsed, the capacitive commutation operation is ended by an active switching-on process by the switch $S_{13}$. The voltage $v_{C11}$ rises very fast to its new value of $v_{C11} = v_{i13}$, and $S_{13}$ takes over the output current $i_{o1}$.

Figure 8:
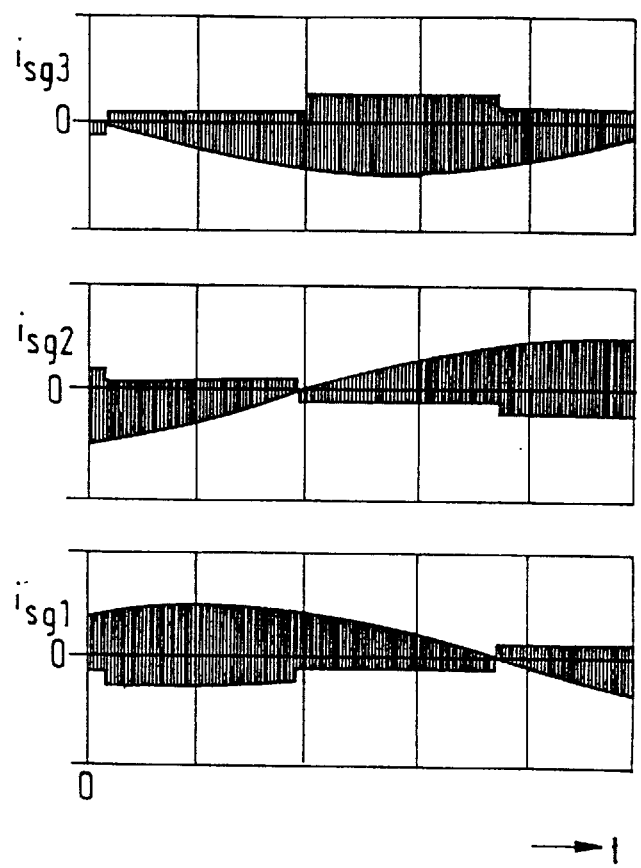
FIG. 8 is an illustration of switch group currents of three switch groups of the quasi-resonant matrix converter.
Figure 9:
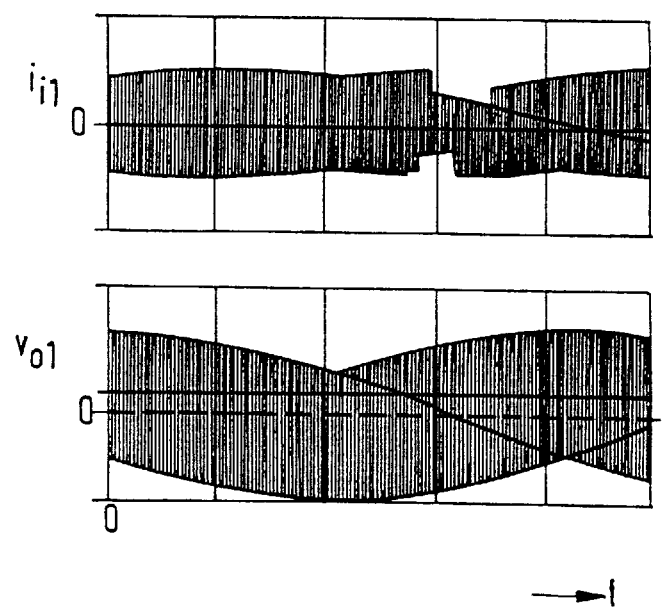
FIG. 9 is an illustration of an input current of an output voltage of the quasi-resonant matrix converter.

FIG. 8 shows the currents $i_{ag1}$, $i_{sg2}$, $i_{sg3}$ in the three switch groups of the quasi-resonant matrix converter for a time period where the output currents have different zero crossings. As is to be expected on the basis of equations (7), (8), (9), the two switch groups which carry the output currents having the same mathematical sign have only one current amplitude during the ARCP commutation operation, which is half as great as that in the further switch group. The output voltage $v_{o1}$ and the input current $i_{i1}$ are shown in FIG. 9 for a phase shift of the output of $\phi_o=30$, when a power factor of $\cos \phi_i=1$ is achieved at the input.

I claim:

1. A three-phase matrix converter for single stage conversion of AC voltages of predetermined amplitude and frequency into AC voltages of any amplitude and frequency, comprising:
    bi-directional switches acting as main switches and combined into three switch groups with three-phase output connections;
    resonance capacitances each connected in parallel with a respective one of said main switches;
    auxiliary commutation devices each connected between said three-phase output connections of a respective two of said switch groups, said auxiliary commutation devices each having an auxiliary switch constructed as a bi-directional switch and a resonance inductance connected in series with said auxiliary switch; and
    said main switches having a switching sequence including two capacitive commutations and one inductive commutation in each of said three switch groups during each period of a switching frequency, the inductive commutations being transformed into capacitive commutations by changing a polarity of currents with said main switches using said resonance capacitances and two of said auxiliary switches in series with two of said resonance inductances connected between output phases carrying currents with opposite directions, the transformed inductive commutations of output currents in said switch groups being synchronized selectively after an end of a shortest duty cycle of initially conducting switches, and at an end of a period of the switching frequency.

2. The matrix converter according to claim 1, wherein said main switches and said auxiliary switches each include two series-connected parallel circuits each having an IGBT semiconductor and a reverse diode.

3. The matrix converter according to claim 1, wherein said main switches each include two series-connected parallel circuits each having an IGBT semiconductor and a reverse diode.

4. The matrix converter according to claim 1, wherein said auxiliary switches each include two series-connected parallel circuits each having an IGBT semiconductor and a reverse diode.

5. The matrix converter according to claim 1, wherein each of said main switches includes two parallel-connected GTO thyristors which can be turned off, and said auxiliary switches each include two parallel GTO thyristors which can be turned off.

6. The matrix converter according to claim 1, wherein each of said main switches includes two parallel-connected GTO thyristors which can be turned off, and said auxiliary switches each include two fast thyristors.

7. The matrix converter according to claim 1, wherein said main switches and said auxiliary switches each include two series-connected parallel circuits of an asymmetric GTO with a reverse diode.

8. The matrix converter according to claim 1, wherein said main switches each include two series-connected parallel circuits of an asymmetric GTO with a reverse diode.

9. The matrix converter according to claim 1, wherein said auxiliary switches each include two series-connected parallel circuits of an asymmetric GTO with a reverse diode.

10. A three-phase matrix converter for single-stage conversion of AC voltages of predetermined amplitude and frequency into AC voltages of any amplitude and frequency, comprising:
    bi-directional switches acting as main switches and combined into three switch groups with three-phase output connections, said main switches having power semiconductors with output capacitances acting as resonance capacitances;
    auxiliary commutation devices each connected between said three-phase output connections of a respective two of said switch groups, said auxiliary commutation devices each having an auxiliary switch constructed as a bi-directional switch and a resonance inductance connected in series with said auxiliary switch; and
    said main switches having a switching sequence including two capacitive commutations and one inductive commutation in each of said three switch groups during each period of a switching frequency, the inductive commutations being transformed into capacitive commutations by changing a polarity of currents with said main switches using said output capacitances and two of said auxiliary switches in series with two of said resonance inductances connected between output phases carrying currents with opposite directions, the transformed inductive commutations of output currents in said switch groups being synchronized selectively after an end of a shortest duty cycle of initially conducting switches, and at an end of a period of the switching frequency.

11. The matrix converter according to claim 10, wherein said main switches and said auxiliary switches each include two series-connected parallel circuits each having an IGBT semiconductor and a reverse diode.

12. The matrix converter according to claim 10, wherein said main switches each include two series-connected parallel circuits each having an IGBT semiconductor and a reverse diode.

13. The matrix converter according to claim 10, wherein said auxiliary switches each include two series-connected parallel circuits each having an IGBT semiconductor and a reverse diode.

14. The matrix converter according to claim 10, wherein each of said main switches includes two parallel-connected GTO thyristors which can be turned off, and said auxiliary switches each include two parallel GTO thyristors which can be turned off.

15. The matrix converter according to claim 10, wherein each of said main switches includes two parallel-connected GTO thyristors which can be turned off, and said auxiliary switches each include two fast thyristors.

16. The matrix converter according to claim 10, wherein said main switches and said auxiliary switches each include two series-connected parallel circuits of an asymmetric GTO with a reverse diode.

17. The matrix converter according to claim 10, wherein said main switches each include two series-connected parallel circuits of an asymmetric GTO with a reverse diode.

18. The matrix converter according to claim 10, wherein said auxiliary switches each include two series-connected parallel circuits of an asymmetric GTO with a reverse diode.

19. A method for operating a three-phase matrix converter for single-stage conversion of AC voltages of predetermined amplitude and frequency into AC voltages of any amplitude and frequency, which comprises:
    combining four-segment switches acting as main switches into three switch groups with three-phase output connections;

connecting a respective resonance capacitance in parallel with each of the main switches;

connecting a respective auxiliary commutation device between the three-phase output connections of each two of the switch groups, and providing each of the auxiliary commutation devices with an auxiliary switch constructed as a four-segment switch and a resonance inductance connected in series with the auxiliary switch;

selecting a switching sequence of a switch group as a function of input voltage intervals and a polarity of an output current, causing two capacitive commutation operations and one inductive commutation operation to take place;

selecting pulse patterns causing the inductive commutation operations per period duration of a switching frequency to take place at the same time; and transforming natural inductive commutation operations into capacitive commutation operations with the auxiliary commutation devices by changing the polarity of the currents with the main switches before active switching processes of the main switches.

20. The method according to claim 19, which comprises always using a concatenated input voltage having the greatest magnitude as the commutation voltage for the transformed inductive commutation operation.

21. The method according to claim 19, which comprises initiating the commutation operation in all three switch groups with the switch group having the shortest duty ratio of the three main switches which are initially on.

22. The method according to claim 19, which comprises selecting the switching sequence to cause the two capacitive non-transformed commutation operations to take place first, and the transformed commutation operation to takes place at the end of the period duration of the switching frequency.

23. The method according to claim 19, which comprises always carrying out the transformation of the commutation operation using two auxiliary switches of the auxiliary commutation devices connected between the three-phase output phases of the switch groups having output currents of opposite polarity.

24. A method for operating a three-phase matrix converter for single-stage conversion of AC voltages of predetermined amplitude and frequency into AC voltages of any amplitude and frequency, which comprises:

combining four-segment switches acting as main switches into three switch groups with three-phase output connections;

providing the main switches with power semiconductors having output capacitances acting as resonance capacitances;

connecting a respective auxiliary commutation device between the three-phase output connections of each two of the switch groups, and providing each of the auxiliary commutation devices with an auxiliary switch constructed as a four-segment switch and a resonance inductance connected in series with the auxiliary switch;

selecting a switching sequence of a switch group as a function of input voltage intervals and a polarity of an output current, causing two capacitive commutation operations and one inductive commutation operation to take place;

selecting pulse patterns causing the inductive commutation operations per period duration of a switching frequency to take place at the same time; and transforming natural inductive commutation operations into capacitive commutation operations with the auxiliary commutation devices by changing the polarity of the currents with the main switches before active switching processes of the main switches.

25. The method according to claim 24, which comprises always using a concatenated input voltage having the greatest magnitude as the commutation voltage for the transformed inductive commutation operation.

26. The method according to claim 24, which comprises initiating the commutation operation in all three switch groups with the switch group having the shortest duty ratio of the three main switches which are initially on.

27. The method according to claim 24, which comprises selecting the switching sequence to cause the two capacitive non-transformed commutation operations to take place first, and the transformed commutation operation to takes place at the end of the period duration of the switching frequency.

28. The method according to claim 24, which comprises always carrying out the transformation of the commutation operation using two auxiliary switches of the auxiliary commutation devices connected between the three-phase output phases of the switch groups having output currents of opposite polarity.

* * * * *